June 3, 1958     F. M. KRANTZ ET AL     2,837,723
WAVEGUIDE COUPLING
Filed May 11, 1953
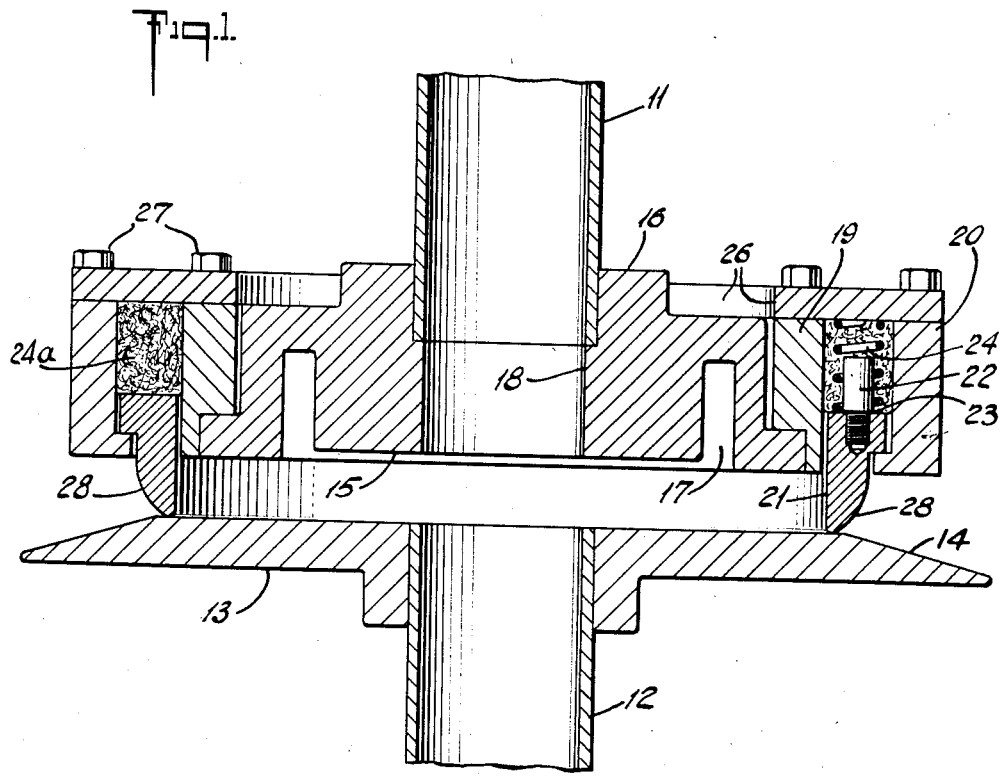
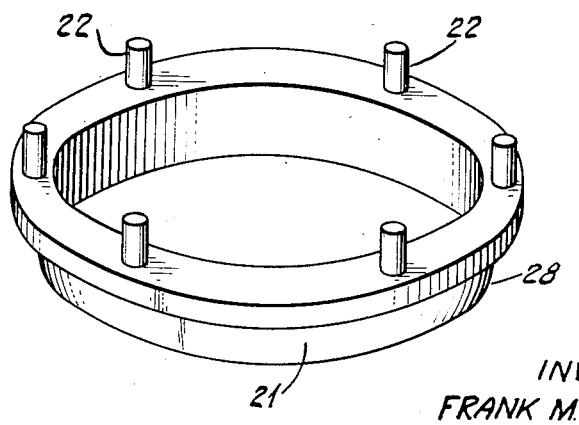
INVENTORS
FRANK M. KRANTZ
HAGAN L. JACKSON
BY George Sipkin
ATTYS Lee J. Huntzberger

:::::::::::::::::::::::::::::::

United States Patent Office 2,837,723
Patented June 3, 1958

2,837,723
WAVEGUIDE COUPLING

Frank M. Krantz, Baltimore, and Hagan L. Jackson, Catonsville, Md., assignors, by mesne assignments, to the United States of America as represented by the Secretary of the Navy Application May 11, 1953, Serial No. 354,089

4 Claims. (Cl. 333—98)

This invention relates to an automatic coupling for waveguides and more particularly to an improved choke joint for coupling two waveguides, the ends of which are in proximity to each other but are separated by a variable spacing and wherein the two waveguides are at some random angular and axial alignment.

An object of the present invention is to provide an automatic waveguide coupling.

A further object is to provide an automatic waveguide coupling which substantially precludes stray radiation from the coupling.

A further object is to provide an automatic waveguide coupling which allows for a considerable amount of relative movement between the coupled waveguide sections and continues to function efficiently.

A further object is to provide an automatic waveguide coupling which allows for a considerable range of relative movement between the coupled waveguide sections while at the same time minimizing stray radiation.

Other objects and many of the attendant advantages of this invention will be readily appreciated as the same becomes better understood by reference to the following detailed description when considered in connection with the accompanying drawings wherein:

Fig. 1 is a partial axial section of the coupling in operative relationship with two circular waveguides, and Fig. 2 is a perspective view of the ring forming part of the coupling shown in Fig. 1.

There is shown in Fig. 1 a pair of aligned circular waveguide sections 11 and 12. Secured to the waveguide section 12 is a circular flange 13. The flange 13 has a low angle frustro-conical cam 14 at its circumference. The waveguide 12 and flange 13 terminate in substantially the same plane. The surface of the flange 13 facing the waveguide 11 is finished by being polished and chrome plated. The finish provides a hard-wearing, corrosive-resistant surface assuring a clean contact surface and having a low coefficient of friction. Where there is no problem involving wear and friction it is probable that a low resistance material such as silver may be used advantageously for plating the flange.

Secured to the waveguide section 11 is a flange member 16 having a stepped bore 18. The reduced portion of the bore 18 has the same diameter as does the waveguide section 11. When the flange 16 is properly secured to the waveguide section 11, a continuous waveguide surface is presented to the high frequency energy passing through the waveguide section and the flange 16. The flange 16 is counterbored slightly at 15. A circular slot 17 one quarter wavelength deep is formed in the flange 16. The inner edge of the slot is radially spaced from the inside surface of the waveguide 11 by a quarter of wavelength as is well known and conventional in the art.

The structure described thus far including the flange 13 (except the cammed surface 14) and the flange 16 the latter of which has a circular slot one quarter wavelength deep comprises what is known in the art as a flat choke. The flat choke joint is commonly used as a coupling for sections of waveguide because of its simplicity and low cost. It permits mechanical deviation of the waveguide sections. Good response is obtained even though the waveguide sections coupled by a flat choke joint are not aligned perfectly. When using a flat choke it is possible to transversely displace by a small amount the axes of the two waveguide sections or tilt slightly the axis of one relative to the other or even move the waveguide sections within a range relative to one another without curtailing seriously the effectiveness of the flat choke joint. However the flat choke joint does permit stray radiation loss through the space between the waveguide sections.

This invention marks a departure from the prior art in that a means is provided for improving the operation of a flat choke joint and substantially eliminating the stray radiation. The means for eliminating stray radiation is attached to the periphery of the flange member 16. The said means comprises a short circular housing cylinder 19 secured to the periphery of the flange 16 by any convenient means such as soldering or brazing or the like. Concentric with the cylinder 19 is a second short housing cylinder 20 of the same length as cylinder 19. In the space between the two cylinders 19 and 20 and substantially coaxial therewith is a floating bridge or ring 21. The ring 21 is provided with a series of equally spaced studs 22 threaded into its upper surface 23. Any convenient number of studs 22 may be used. Six studs have been selected for purposes of this description. The studs 22 function as guides for compression springs 24. The several elements 19, 20 and 21 are retained in assembled relationship by means of a flat ring member 26 and circular series of bolts 27. The outside diameter of the cylinder 19 and the inside diameter of cylinder 20 are designed to permit free axial movement of the ring 21 and limited tilting of the ring 21 relative to the waveguide 11. The spaces between the springs 24 are filled with a matted metal mesh 24a. Matted metal mesh is analogous to felt. It is made of metallic strands where felt is made of either animal or vegetable strands. The mesh may be made either of strands of silver or of strands of copper coated by silver or any equivalent thereof. The sliding surfaces are polished and chrome plated. The sliding surfaces include not only the cam flange 14 as previously set forth but also the contact ring 21 and the inside surfaces of the spring chamber between which the contact ring 21 slides. As mentioned above the chrome plating has the advantage of a hard wearing surface with a low coefficient of friction, and a corrosion resistant surface assuring a clean contact surface.

Floating contact ring 21 is provided with a curved outer surface 28. If the two waveguide sections 11 and 12 move relative to each other either transversely or angularly the combination of curved surface 28 and the surface of low angle cam 14 on the flange 13 assures that the coupling does not bind. By means of the aforesaid arrangement care is taken so that the sliding contact surfaces engage each other at some angle considerably below the angle whose tangent is equal to the coefficient of friction of the two sliding surfaces.

In operation the floating contact ring assembly comprising flange 16, cylinders 19, 20, spring-biased ring 21, and flat ring 26 is secured to the waveguide section 11 and the flange 13 is secured to the waveguide section 12. The resulting coupling comprises the improved choke joint. Waveguide sections 11 and 12 are coaxial as shown on the drawing and are closely spaced from one another. A flat choke joint including a circular slot as 17 is conventional and provides for effective coupling between adjoining waveguide sections such as 11 and 12. However the floating ring contact assembly including the contact ring 21 improves the action of the flat choke joint by virtually eliminating stray radiation at the joint. The contact ring 21 under the bias of springs 24 makes good electrical contact with the surface of the flange 13. The matted metal mesh included between the cylinders 19 and 20 in the spaces between the springs 24 functions in part to complete good electrical contact between the floating contact ring 21 and the rings 19 and 20. The floating contact ring 21 and the supporting structure, 19, 20 etc. which retains it in good electrical contact with the flange 13 substantially eliminates all stray radiation that could leak out of a flat choke joint. The value of this choke joint shielding may be rapidly realized when a flat choke joint is located in close proximity to a very sensitive receiver. Without good shielding such as is accomplished by the floating contact ring assembly of this invention the interference at the receiver resulting from the stray radiation from an open flat choke joint could effectively blank out all incoming intelligence. The usefulness of this device may be further appreciated when it is used for joining two waveguides which are placed in proximity to each other but which are separated by a variable spacing. In addition the waveguides may be at some random angular and/or axial alignment. When used under these conditions the mounting structure for the floating contact ring 21 and the biasing springs 24 therefor permit the ring to tip sideways or adjust through a considerable range with a substantial contact pressure maintained on its circumference. The coupling described does not bind because the sliding surfaces all engage each other at an angle considerably below the angle whose tangent is equal to the coefficient of friction of two sliding surfaces. All of the sliding surfaces are polished and chrome plated. This includes not only the low angle cam 14 of flange 13 and the contact ring 21 but also the inside surfaces of the spring chamber against which the contact ring 21 slides. The chrome plating is characterized by a hard-wearing surface with a low coefficient of friction and the resistance of the chrome to corrosion assures a clean contact surface. The combination of these features not only eliminates stray radiation but also reduces attenuation at the choke joint to a very minimum. The usefulness of this device is boldly evident when used for coupling a transmitter unit to a run of rigid waveguide where the transmitter is shock mounted. Its usefulness extends to any situation where a flexible connection is desired. No matter what the specific use the compactness and relatively low cost of the above described coupling makes it preferable to flexible waveguide in most applications.

Obviously many modifications and variations of the present invention are possible in the light of the above teachings. It is therefore to be understood that within the scope of the appended claims the invention may be practiced otherwise than as specifically described.

We claim:

1. A waveguide coupling comprising a pair of waveguide sections, a pair of disc-shaped radial flanges mounted one on each of the adjacent ends of said sections whereby said flanges are disposed in close proximity to each other, a continuous ring-shaped bridge loosely mounted on one of said flanges and protruding axially therefrom toward the other of said flanges, means for biasing said ring-shaped bridge axially into contact with the other of said flanges, the protruding contact surface of said ring being curved to provide an adjustable contact surface, the surface of the flange contacted by said ring being bevelled to form an adjustable cam surface for seating said ring, conducting means for electrically connecting said bridge and its supporting flange, and said supporting flange being formed with a circular choke slot.

2. A waveguide coupling comprising a pair of proximate waveguide sections each having a free end, a first flange formed with a central opening and secured to the free end of one of said waveguide sections, a second flange formed with a central opening and secured to the adjacent free end of the other of said waveguide sections, said first flange being formed with a continuous bearing surface extending from its periphery to its central opening, the bearing surface of said first flange facing toward said second flange, said second flange having an annular channel coaxial with the central opening thereof and opening toward said first flange, annular electrical bridge means mounted in the annular channel in said second flange and being sufficiently smaller in cross section than the annular channel whereby said annular electrical bridge means is reciprocable in and tiltable relative to the axis of the annular channel and in bearing engagement with the bearing surface of said first flange, and conducting means in the annular channel electrically connecting said electrical bridge means and said second flange.

3. A waveguide coupling comprising a pair of waveguide sections each having one end that is closely spaced from and approximately in line with the one end of the other section, a first flange formed with a central opening and secured to the one end of one of said waveguide sections, a second flange formed with a central opening and secured to the one end of the other of said waveguide sections, said first flange being formed with a smooth bearing surface extending from its periphery to its central opening, the bearing surface of said first flange facing toward said second flange, annular electrical bridge means, a conductive annular guide on and in continuous conductive engagement with said second flange and coaxial with the central opening thereof and directed toward said first flange, said electrical bridge means being in registration with said annular guide, the diameters of the registering surfaces of said electrical bridge means and said annular guide being such that there is substantial clearance therebetween, whereby said bridge means can adjust axially and angularly relative to said second flange, flexible annular conducting means in continuous engagement with said bridge means and said annular guide to ensure good contact and to prevent radiation leakage therebetween, means continuously urging the entire bridge means away from said second flange means and into engagement with the bearing surface of said first flange for making good contact with the first flange and for preventing radiation leakage between said flanges.

4. A waveguide coupling as defined in claim 3 wherein one of said flanges is formed with a choke joint slot intermediate the said electrical bridge and said one ends of said waveguide sections.

References Cited in the file of this patent

UNITED STATES PATENTS

| | | |
|---|---|---|
| 2,407,076 | Harkness | Sept. 3, 1946 |
| 2,462,370 | Drake | Feb. 22, 1949 |
| 2,513,067 | Stephan | June 27, 1950 |
| 2,573,713 | Kannenberg | Nov. 6, 1951 |
| 2,597,081 | Goodhue | May 20, 1952 |
| 2,683,255 | Koos | July 6, 1954 |
| 2,745,071 | Miller | May 8, 1956 |